(12) United States Patent
Kornicer et al.

(10) Patent No.: US 6,479,127 B1
(45) Date of Patent: Nov. 12, 2002

(54) MANUFACTURE OF MULTI-LAYERED BOARD WITH A UNIQUE RESIN SYSTEM

(75) Inventors: Dragan R. Kornicer, Matthews, NC (US); Robert D. Palardy, Athens, GA (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

(21) Appl. No.: 09/416,530

(22) Filed: Oct. 12, 1999

(51) Int. Cl.⁷ .................................................. B32B 5/12
(52) U.S. Cl. .................. 428/105; 162/131; 162/132; 162/133; 162/225; 428/106; 428/109; 428/110; 428/218; 428/219; 428/220; 428/337; 428/339; 428/537.1
(58) Field of Search ................... 428/105, 110, 428/218, 106, 219, 220, 337, 339, 537.1; 162/131, 132, 133, 225

(56) References Cited

U.S. PATENT DOCUMENTS

| | | |
|---|---|---|
| 2,473,145 A | 6/1949 | Hesselbart .................. 260/57 |
| 3,905,934 A | 9/1975 | Gardikes |
| 3,919,017 A | 11/1975 | Shoemaker et al. ....... 156/62.2 |
| 3,930,110 A | 12/1975 | Shoemaker et al. ........ 428/424 |
| 4,209,433 A | 6/1980 | Hse .......................... 260/29.3 |
| 4,293,480 A | 10/1981 | Martin et al. |
| 4,546,039 A | 10/1985 | Horacek et al. ............ 428/357 |
| 4,602,069 A | 7/1986 | Dunnavant et al. |
| 4,683,252 A | 7/1987 | Dunnavant et al. |
| 4,944,823 A | 7/1990 | Stofko ........................ 156/283 |
| 4,961,795 A | 10/1990 | Detlefsen et al. |
| 5,001,190 A | 3/1991 | Carpenter et al. |
| 5,047,275 A | 9/1991 | Chiu .......................... 428/106 |
| 5,101,001 A | 3/1992 | Henry et al. |
| 5,179,143 A | 1/1993 | Konig et al. |
| 5,217,665 A | 6/1993 | Lim et al. |
| 5,525,394 A | 6/1996 | Clarke et al. ............... 428/105 |
| 5,534,295 A | 7/1996 | Schlichter et al. |
| 5,607,633 A | 3/1997 | Sleeter et al. |
| 5,733,952 A | 3/1998 | Geoffrey |
| 5,942,058 A | 8/1999 | Sleeter et al. |
| 5,981,631 A * | 11/1999 | Ronden ....................... 524/13 |
| 5,993,709 A | 11/1999 | Bonomo et al. |
| 6,187,892 B1 | 2/2001 | Markusch et al. |
| 6,214,265 B1 | 4/2001 | Rosthauser et al. |
| 6,294,117 B1 | 9/2001 | Rosthauser et al. |
| 6,352,661 B1 | 3/2002 | Thompson |

* cited by examiner

Primary Examiner—Nasser Ahmad
(74) Attorney, Agent, or Firm—Carlos Nieves; David Mitchell Goodrich

(57) ABSTRACT

The present invention relates to the manufacture of a multi-layered board having a stable, and moisture-resistant surface. To accomplish this and other advantages of the invention, an improved binder system is used in the production of the surface layers of a multi-layered board which combines an. excellent resin penetration inside the wood constituents of the board's surface layers, with a strength, durability and resistance to ambient water and moisture. The improved binder system used in the production of the board surface layers according to this invention involves contacting wood pieces with a binder composition comprised of a curable powdery aldehyde resin and a curable isocyanate resin in the substantial absence of free water to provide a composite mixture that can be formed into a surface layer for assembly and lamination together with other wood and resin composite layers.

14 Claims, 1 Drawing Sheet

MANUFACTURE OF MULTI-LAYERED BOARD WITH A UNIQUE RESIN SYSTEM

BACKGROUND OF THE INVENTION

1. Field of the Invention

The present invention relates to manufacture of multi-layered board materials, and, more particularly, to manufacture of oriented strand board and the like using an improved resin system.

2. Description of the Prior Art

Oriented strand board ("OSB") is commercially available from a number of companies including J. M. Huber Corporation, Georgia-Pacific Corporation, Louisiana-Pacific, as well as other sources. OSB material generally has multiple layers of wood "flakes" or "strands" bonded together by a resin binder. The flakes are made by cutting logs into thin slices with a knife edge parallel to the length of a debarked log. The cut flakes are broken into narrow strands generally having lengths oriented parallel to the wood grain that are larger than the widths. The flakes are typically 0.01 to 0.05 inches thick, although thinner and thicker flakes can be used in some applications, and are typically, less than one inch to several inches long and less than one inch to a few inches wide.

In the fabrication of oriented strand board, the flakes are first dried to remove water, and are then coated in a blender with a thin layer of binder and sizing agent. The coated flakes are then spread on a conveyor belt to provide a first surface ply or layer having flakes oriented generally in line with the conveyor belt, then one or more plies that will form an interior ply or plies of the finished board is (are) deposited on the first ply such that the one or more plies is (are) oriented generally perpendicular to the conveyor belt. Then, another surface ply having flakes oriented generally in line with the conveyor belt is deposited over the intervening one or more plies having flakes oriented generally perpendicular to the conveyor belt. Plies built-up in this manner have flakes oriented generally perpendicular to a neighboring ply insofar as each surface ply and the adjoining interior ply. The layers of oriented "strands" or "flakes" are finally exposed to heat and pressure to bond the strands and binder together. The resulting product is then cut to size and shipped. Typically, the resin and sizing agent comprise less than 10% by weight of the oriented strand board.

Oriented strand board has a wide variety of uses as a construction material such as for flooring, sheathing, concrete forming, and so forth. Conventional oriented strand board has experienced a problem in that "flake pops" tend to appear in the surface layer after the board is exposed to humidity, rain or other sources of moisture. For instance, flake pop problems may occur in flooring applications where the OSB is subjected to pooled water for extended periods of time. The flake pops are defects occurring in the exposed surface of an OSB in which one or more individual wood flakes delaminate from the bulk of the surface layer and curl or project outward from the rest of the surface layer. These flake pops can rise up to several inches above the surface layer and often will become separated from the surface layer leaving an indentation and discoloration in their place. As a consequence, the flake pops create an unsightly, bumpy, and nonuniform exposed surface. Flake pops are unacceptable to many customers. An OSB surface having them typically must be restored by sanding procedures.

In the prior art literature, U.S. Pat. No. 2,473,145 to Hesselbart describes preparation of highly water-soluble, fusible thermosetting phenol-formaldehyde resin solid particles capable of serving as an air-drying tack-free adhesive, which can be used for bonding wood sheets or plies into plywood. The Hesselbart patent does not describe use of the phenol-formaldehyde resin in combination with any other resins such as isocyanates, nor applicability of the descriptions to OSB manufacture.

U.S. Pat. No. 4,944,823 to Stofko describes bonding together wood surfaces using a preferably dry binder formulation formed of a mixture of an isocyanate and a sugar or starch, in which the starch or sugar replaces a quantity of the isocyanate which would normally have been used to thereby reduce manufacturing costs. This patent is directed to formaldehyde-free binder formulations for lignocellulosic materials, and it teaches that the isocyanate reacts with the hydroxy groups in the sugar to form urethane groups.

U.S. Pat. No. 5,047,275 to Chiu describes a powdered resin useful in manufacture of composition boards, such as wafer board and OSB, where the spray dried powdered resin is a phenol-aldehyde chelated with an oxo-boron compound.

None of the prior art mentioned above directly addresses the pop flake problem nor proposes a solution to that problem. Therefore, the provision of technique oriented strand board and the like which would reduce and even prevent the pop flake problem would represent a significant advance in the field.

SUMMARY OF THE INVENTION

The present invention relates to the manufacture of a multi-layered board having a stable, smooth, and moisture-resistant surface. To accomplish this and other advantages of the invention, an improved binder system is used in the production of the surface layers of a multi-layered board which combines strength, durability, and excellent resin penetration inside the wood constituents of the board's surface layers.

Among other things, this invention prevents curled flake failures, or so-called "flake pops", from occurring in the wood surfaces of multi-layered board even after a board's exposure to moisture or other weathering. As a consequence, this invention achieves and then preserves the superior surface quality of the board product during its handling, storage and when put into service.

The improved binder system used in the production of the board surface layers according to this invention involves contacting wood pieces with a binder composition comprised of a curable powdery phenol-formaldehyde resin and a curable isocyanate resin in the substantial absence of free water to provide a composite mixture that can be formed into a surface layer for assembly and lamination together with other wood and resin composite layers. The term "free", as used herein, means unreacted, and any moisture content contained by the wood pieces themselves is not considered as "free" water for purposes of this disclosure. The curable isocyanate resin is generally used in liquid form, and preferably as a neat liquid. The term "neat", as used herein, means non-diluted by or non-dispersed in water. Consequently, in one aspect, this invention effectively utilizes an overall non-aqueous binder system.

Advantageously, the powdery aldehyde and isocyanate binder system constituents are simultaneously fed into a mechanical blender from separate feed streams for contacting and mixing with wood pieces introduced to the blender. The curable powdery aldehyde resin particles stick to the surfaces of the wood pieces in the surface layer mix, and then penetrate well inside the curled strands during the blending process of the surface layer, where they become fully cured during later hot pressing and consolidation of a stack of board layers comprising the surface layers.

In one advantageous embodiment of the invention, the manufactured multi-layered board is oriented strand board in which the opposite surface layers are prepared with the above-mentioned non-aqueous binder material and having its strands oriented in the machine or cross-machine direction. Preferably, the surface layers are used in combination with one or more core (interior) layers formed of composites of wood pieces and a suitable binder in general having strands oriented in a direction substantially perpendicular to those in the surface layers or in random directions.

Preferably, the surface layer binder material is formulated such that the powdery curable aldehyde resin comprises phenol-formaldehyde and the curable isocyanate resin comprises an aromatic polyisocyanate. Further, the binder material used in the surface layers encountered in this invention preferably comprises approximately 10 to 90%, and more preferably 20 to 49%, by weight phenol-formaldehyde and approximately 90 to 10%, and more preferably 80 to 51%, by weight aromatic polyisocyanate.

The present invention is also directed to the board products themselves provided by the manufacturing techniques described herein. This invention is generally applicable to the manufacture of multi-layered board materials in which the constituent layers or plies are composites of small wood pieces, such as wood strands, flakes, chips, wafers, slivers, or particles, or the like, which are bound together with a binder resin. This invention is especially applicable to the manufacture of oriented strand board (OSB), but it is not limited thereto, as multi-layered waferboards, flake boards, particle boards, and the like, are also encompassed by the invention.

The multi-layered boards manufactured by this invention can be used advantageously as a general construction material for exposed or covered flooring, concrete formers, sheathing walls, and roofs, and so forth. Due to the excellent moisture-resistance imparted by the above-mentioned binder system used in the surface layers, the board products of this invention are well-suited for use as exposed flooring in damp environments.

For purposes of this application, "powdery", "powdered" and other variants thereof used herein to characterize the phenol-formaldehyde resin mean a flowable mass of fine dry solid particles or a particulate. The term "granular" has the same meaning as powdery for purposes of this application.

BRIEF DESCRIPTION OF THE DRAWINGS

The foregoing and other aspects, benefits and advanatges of the present invention will be better understood from the following detailed description of the preferred embodiments of the invention with reference to the drawings, in which.

Figure 1:
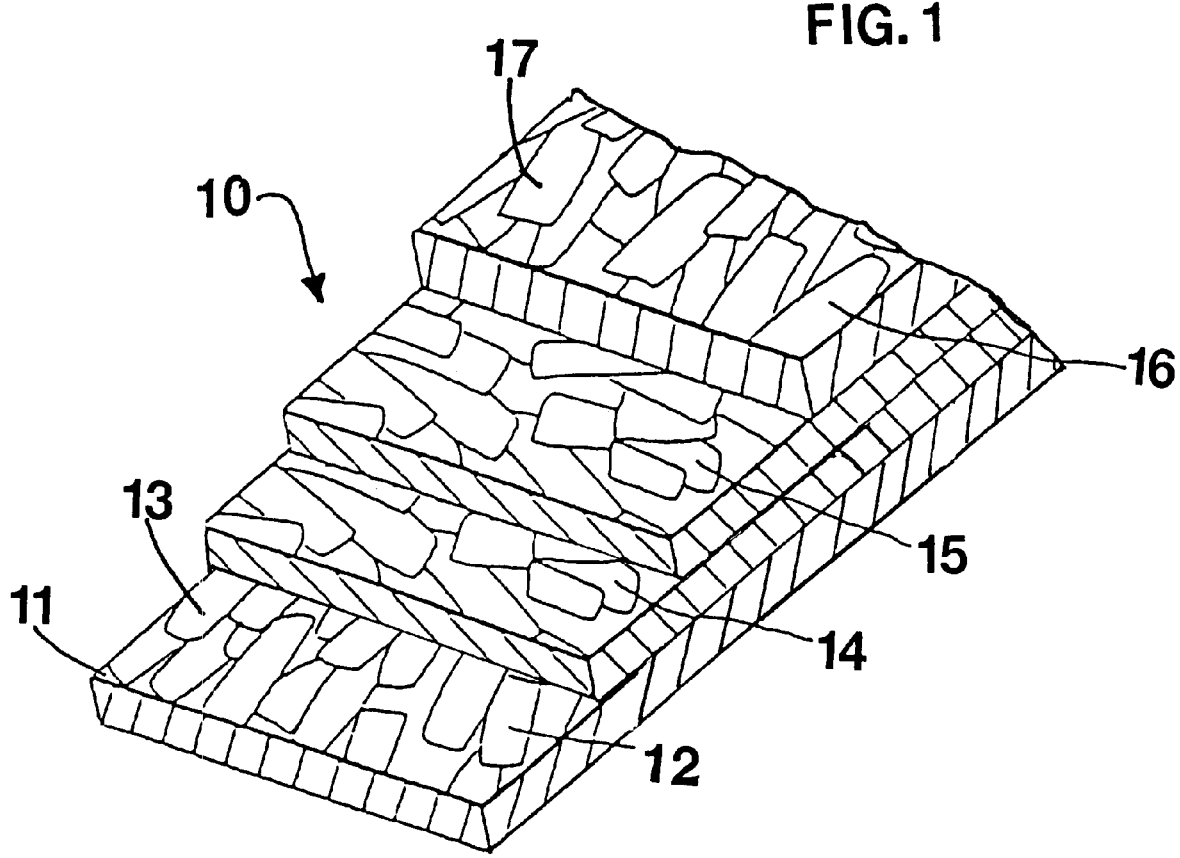
FIG. 1 is a cut-away isometric view of an oriented strand board panel showing the general orientation of wood flakes in the pressed, composite product of one embodiment of the present invention.

The drawings are illustrative and are not necessarily drawn to scale. Similarly used reference numerals in different figures indicate the same features.

DETAILED DESCRIPTION OF THE PREFERRED EMBODIMENTS OF THE INVENTION

Referring to FIG. 1, an oriented strand board (OSB) 10 manufactured according to one embodiment of this invention is shown. The OSB 10 is comprised of multiple layers or plies 12, 14, 15, and 16, each formed of a composite of wood flakes ("strands") bound together by resin 11. Layers 12 and 16 form the exterior or opposite surface layers of the OSB 10. For instance, surface layer 16 includes the upper exposed surface 17 of the assembly 10. Layers 14 and 15 form core layers sandwiched between the surface layers 12 and 16. However, depending on the implementation envisaged, it may be possible to have zero, one, or two or more middle or core layers.

This invention is directed to a new resin system used during flake blending processing in the manufacture of at least one or both of the surface layers 12 and 16 in particular of the oriented strand board (OSB) 10, or other comparable multi-layered wood composites. Although the detailed descriptions herein refer to OSB type board for convenience, it will be appreciated that the invention has wider applicability to other types of multi-layered cellulosic composites.

In general, in fabricating the oriented strand board 10, a surface layer (e.g., layer 12) is first formed by coating dried wood flakes 13 in a blender with a thin layer of a binder composition 11 of this invention described in greater detail infra. The coated flakes are then spread on a conveyor belt to provide the first ply or layer 12 having flakes oriented generally in line with the conveyor belt, then a second ply 14 and a third ply 15 are successively deposited on the first ply 12 such that the second ply 14 and third ply 15 are each oriented generally perpendicular to the conveyor belt.

Then, another surface ply 16 is deposited over the third ply 15 having flakes oriented generally in line with the conveyor belt, similar to the first ply 12, such that plies built-up in this manner have flakes oriented generally perpendicular to a neighboring ply. Alternatively, all plies can have strands oriented in random directions. The multiple plies or layers can be deposited using generally known multi-pass techniques and strand orienter equipment. It will be appreciated that the plurality of separate middle or core layers deposited also could have random strand orientations provided relative to adjoining surface plies having strands oriented in the machine direction.

Figure 2:
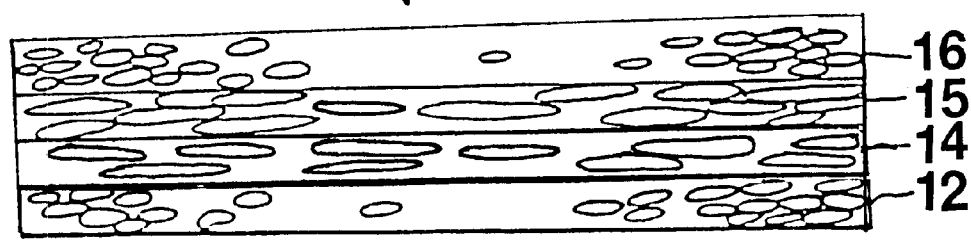
FIG. 2 is an end view of the oriented strand board panel shown in FIG. 1.

After the stack of plies is assembled, the lay-up is heat pressed to consolidate the assembly into unitary sheathing. FIG. 2 is an end view of the exemplified finished OSB product.

The new resin system used in one or both of the OSB surface layers 12 and 16 involves the simultaneous application of an isocyanate resin and a powdered aromatic phenol-aldehyde thermoset material in the same blender in the preparation of the surface layers of the OSB. The powdered aromatic aldehyde thermoset effectively replaces a fraction of the MDI resin that otherwise would be needed. Preferably, a powdered phenol-formaldehyde is used that penetrates very well inside curled flakes of the surface layer(s) of the OSB. It also enhances resin distribution inside the curled flakes in the surface layer of OSB to improve the board product quality by reducing curled flake failures without increasing resin costs. The MDI binder ingredient renders the OSB structurally strong and durable and generally improves the water resistance, while the phenol-formaldehyde ingredient prevents flake popping and improves strength of the OSB among other things. The resin binder system used for one or both the OSB surface layers, as initially reacted, preferably is non-aqueous and contains no water or, at most, only nominal impurity levels (viz., less than 1 wt. % and preferably less than 0.5 wt. % water based on the total weight of the binder system).

The isocyanate resin used in the binder system of this invention preferably are polyisocyanate compounds having at least two active isocyanate (NCO) groups per molecule. The isocyanate binder is used in combination with the aldhehyde binder in the surface layers of the OSB, and preferably is used as the sole binder in interior or core layer or layers of the OSB sandwiched between the surface layers. The isocyanate resin preferably is an aromatic polyiisocyanate such as diphenylmethane diisocyanate (MDI), triphenylmethane triisocyanates, toluene (or tolylene) diisocyanate (TDI), and mixtures of aromatic polyisocyanates. Suitable commercial isocyanate products for the practice of this invention include RUBINATE products obtained from ICI Polyurethanes, such as RUBINATE 1840 (i.e., MDI products).

The aldehyde component is a powdered or granular form of a thermosetting phenoplast. The aldehyde can be a powdered forms of formaldehyde, paraformaldehyde, acetaldehyde, urea formaldehyde, melamine formaldehyde, and so forth. The aldehyde component preferably is a powdered phenol formaldehyde. The powdered phenol-formaldehyde can be made by obtaining an aqueous dispersion of phenol-formaldehyde by a conventional alkaline condensation reaction of phenol and formaldehyde followed by spray drying. The phenol-formaldehyde solids content generally will be between about 30 to 60 weight percent. During spray drying, the phenol-formaldehyde dispersion is converted into a fine spray in which the water component of the feed is evaporated by means of a stream of hot air and dried separated powdery resin product is recovered. The inlet and outlet temperature of the hot air used for drying of the phenol-formaldehyde resin must be controlled so as to effect water separation without causing undue premature curing of the phenol-formaldehyde resin.

The resin particle sizes, moisture content, and molecular weight of the spray dried PF resin are controlled by techniques known in the spray drying field, such as those described in U.S. Pat. No. 5,047,275, which teachings are incorporated herein by reference. The majority of the phenol-formaldehyde resin particles generally should have a size less than 100 microns, and preferably less than 50 microns, to maximize coverage of the wood strands or chips. The molecular weights of the powdered phenol-formaldehyde resin generally will fall between 500 and 2500. Suitable commercial sources of powdered phenol-formaldehyde resins for the practice of this invention are available as TEMBEC resins (e.g., TEMBEC 340, TEMBEC 903), or powder phenol-formaldehyde resins made by Neste.

The major resin component of the surface layer binder system used in this invention is the isocyanate component while the powdered phenol-formaldehyde is used in lesser relative amounts. Generally, the isocyanate, such as MDI, is used in the surface layer binder system of this invention in the range of approximately 10 to 90% by weight, preferably between 51 to 80% by weight, based on the total amount of resin solids in the binder formulation. Generally, the powdered aldehyde, such as powdered PF, is used in the surface layer binder system with the isocyanate in the range of approximately 90 to 10% by weight, preferably between 49 to 20% by weight, based on the total amount of resin solids in the solids in the binder formulation. The total amount of isocyanate and formalaldehyde resin solids used in making the surface (exterior) plies 12 and 16 is approximately 3 to 10 percent based on the total weight of the uncured binder and fiber mixture used in making those plies.

The present invention provides a surface layer binder system in which the binder/wood mixtures preferably are contacted and initially reacted in the substantial absence of free water. Among other things, isocyanates are unstable in the presence of and react with water, and water can saturate the exposed wood surfaces to interfere with the resin bonding. Although phenol-formaldehyde resin will produce some water as a by-product when it cures, as phenol-formaldehyde resins generally cure by a condensation reaction, the present invention nonetheless substantially reduces water-related problems by ensuring that the binder system for the surface layer or layers of the OSB is initially formulated (mixed together) and initially reacted (cured) in the substantial absence of free (unreacted) water.

Preferably, the isocyanate and aldehyde are used a binary resin system, although minor fractions of other solid or neat resin ingredients can be tolerated or included as long as they do not adversely impact the bonding, water-proofing and other requirements of the surface layer resin system identified herein. If too little isocyanate component is used, the OSB may have insufficient strength and durability. If too little aldhehyde is used, the OSB becomes more susceptible to having surface defects such as curled flakes in the surface ("flake pops"), especially in moist environments. The curled flakes are undesirable as they create visually noticeable defects in the surface of the board product. Indentations are left in the board surface where the curled flakes separate from the surface. To restore the board, intense sanding or similar surface abrasion procedures would be required.

Additionally, the binder compositions used in making plies 12, 14, 15 and/or 16 optionally can include minor fractions of processing adjuvants and additives in addition to the binder resins per se, such as a small amount of wax for sizing. For instance, a slack wax can be included in amounts typically less than 3%, such as between about 0.5 to 2.5%, of the total weight of the fiber used in the ply incorporating same.

Aside from the binders and any additives, such as slack or emulsified wax, the balance of the mixes used in making plies 12, 14, 15 and 16 are the wood strands. The size of the strands in different layers and within a layer can vary and the number and ratio of layers in the oriented strand board 10 also can vary to meet a wide range of design requirements. In general, the strands have an aspect ratio (length to width) of approximately 0.2 to 50, and a moisture content between about 1 to 25 percent (by weight), and preferably are pre-dried to less than about 10 percent (by weight) in moisture before blending with the binder resin and pressing. This moisture content of the wood is absorbed by the wood and is not referred to as "free" water for purposes of characterizing the binder system used in this invention.

The oriented strand board is manufactured by generally known and practiced conventional techniques, except with the noteworthy exception that prior resins used for OSB surface layers are replaced in this invention in at least one of the surface layers by a diphenylmethane diisocyanate (MDI) resin/powdered phenol formaldehyde resin system. Binder formulations according to the present invention are blended together with flakes and any other additives by mixing or using other known agitating means for approximately several minutes. A stream of the wood strands is mixed with the simultaneously added powdery aldehyde and liquid isocyanate binders and other additives, using mechanical agitation, until the binder formulation is substantially uniformally dispersed throughout the strands and adheres to surfaces of the strands. The resulting mixture of wood pieces and binder formulation is then deposited on a conveyor as a ply or layer and assembled into a lay-up with other mixtures.

The assembled lay-up is heat pressed to cure the resin and consolidate the assembly into a unitary board material.

Conventional means can be used for this purpose such as a platen press or a continuous press arrangement. After heat pressing the OSB into a consolidated assembly, the exterior surfaces can be sanded, or additional materials can be laminated to them, to impart additional smoothness. Conventional temperatures, time periods, and pressures are otherwise generally used. The pressing temperature can vary generally from about 175 to 250° C., and the pressure can vary from about 450 to 700 psi. In general, the present invention is used to make OSB have a thickness between about 0.25 to 2 inches, although not limited thereto. The individual plies of the OSB can have approximately similar or different individual thicknesses. The consolidated OSB boards made by this invention generally have a moisture content less than about 10 wt. %. The OSB can be made batch-wise or continuously.

The following non-limiting examples will further illustrate the present invention. All parts, ratios, concentrations, and percentages are based upon weight unless otherwise specified.

EXAMPLE 1

As the wood boards used for the experimental analysis, raw OSB board with a four-ply composite construction was used. For each of runs 1 and 2, and comparative run C1, the two exterior layers were formed with strands oriented in the machine direction using strands formed of dry southern yellow pine (moisture content: 6–8% Face, 3–5% Core) flaked to a thickness of about 0.03 inch, a length between about 1 to about 5 inches, and average width of about one-quarter to about one inch, in which the strands were blended with a small amount of slack wax (approximately 1.5 wt. %) and varying amounts of powdered phenol-formaldehyde resin (TEMBEC 340) and/or MDI (RUBINATE 1840), as indicated in Table 1. The two adjoining core (interior) layers of the OSB board in runs 1, 2 and C1 were formed with strands oriented in the cross machine direction and blended using MDI resin alone (approximately 2 wt. %), RUBINATE 1840, obtained from ICI Polyurethanes, and a small amount of slack wax (approximately 1 wt. %) blended with the same type of strands as described above. The various plies were formed on a moving forming line and then the stack was consolidated using a hydraulic hot press with platens heated to 400°F. at about 700–1000 psi for 3 minutes to provide OSB having a consolidated thickness of approximately ¾ inch. The consolidated OSB of runs 1, 2 and C1 each was then sanded on both faces with a belt sander to smoothen the exterior surfaces and provide for calibrated thickness. The raw OSB product had a thickness of 0.700 inches, and it was cut into separate panels (48 in. ×96 in.). The individual plies of the OSB had approximately similar individual thicknesses.

Immediately after each production run, two sanded boards from each of runs 1, 2 and C1 were exposed to 48 hours of simulated rain from a garden sprinkler.

As additional comparative boards, prefabricated (²³⁄₃₂ inch thick) oriented strand board (OSB), manufactured by J. M. Huber Corporation, was also used as a comparative example, and is indicated as run C2 in Table 1. The prefabricated board was a four-ply OSB similar to C1 having MDI but not powdered PF used in the surface plies. A prefabricated commodity board, indicated as C3 in Table 1, also was tested for comparison, obtained from J. M. Huber Corp. Commerce, Ga., U.S.A., which had been produced as a part of a regular production run, which was formed with powdered PF resin but not MDI in the surface plies of the four ply structure. A single board for the comparative runs C2 and C3 were aged in the same moist environment in the same way as runs 1 and 2 prior to also assessing the surface appearance of those board products.

After the moisture exposure, the thickness of the various boards was measured using a standard micrometer at locations 3 inches (7.62 mm) away from both side edges of the 48 inch length sides on each board (to minimize the effect on the measurements of any edge swell caused by any difference in sealing treatment between the boards). Thickness Swell was calculated by comparison to the initial thickness of 0.700 inch (1.78 mm). For purposes of the reported results in Table 1, a flake pop is defined as a curled flake extending vertically from upward from the major horizontal plane of the surface of the exposed exterior ply of the OSB a distance of at least 0.2 inches. For runs 1, 2 and C1 where two boards were tested, the surface appearance results are reported as the average value for the two boards.

TABLE 1

| Run | MDI, wt % | Powdered PF, wt % | # of boards | Thickness Swell, % | Surface Appearance (flake pops/ board) |
|---|---|---|---|---|---|
| 1 | 4.0 | 1.3 | 2 | 9.5 | 3–4 (ave.) |
| 2 | 3.0 | 2.6 | 2 | 8.3 | 1 (ave.) |
| C1 | 5.0 | 0.0 | 2 | 7.2 | >10 (ave.) |
| C2 | 5.0 | 0.0 | 1 | 10.2 | 3 |
| C3 | 0.0 | 5.0 | 1 | 27.3 | 1 |

The results shown in Table 1 reveal that boards made with the powdered phenol-formaldehyde/MDI combinations of the present invention, or the all powdered phenol-formaldehyde resin formulation of C3 (powdered phenol-formaldehyde resin alone as binder), displayed significantly better surface appearance in terms of reducing the flake popping observed than the boards made with 100% MDI as the resin binder (C1). However, the comparative board of run C3 made using only the powdered phenol-formaldehyde in the resin binder and without any MDI had relatively high Thickness Swell (27.3%). The results showed that as the percent of powdered phenol-formaldehyde resin was increased in run 2 as compared to run 1 that both the thickness swell decreased and the surface appearance improved after the moisture testing. As an aesthetic observation, the boards made with the powdered phenol-formaldehyde had a somewhat darker surface appearance although this did not impact the functionality of the boards.

While the invention has been described in terms of its preferred embodiments, those skilled in the art will recognize that the invention can be practiced with modification within the spirit and scope of the appended claims.

What is claimed is:

1. An oriented strand board, comprising:
   first and second surface layers each comprised of wood strands substantially oriented in a first direction, wherein the wood strands are bonded by curing of a binder material contacting the wood strands where the binder material is substantially free of water and comprised of a curable powdery aldehyde resin and a curable isocyanate resin; and
   a core layer located between and bonded to the first and second surface layers, where the core layer comprises wood strands substantially oriented in a second direction that is different from the first direction.

2. The board according to claim 1, wherein the second direction is oriented substantially perpendicular to the first direction, and wherein the curable powdery aldehyde resin comprises phenol-formaldehyde and the curable isocyanate resin comprises an aromatic polyisocyanate.

3. The board according to claim 1, wherein the binder material comprises approximately 10 to 90% by weight phenol-formaldehyde and approximately 90 to 10% by weight aromatic polyisocyanate.

4. The oriented strand board according to claim 1, wherein each layer comprises from about 0.5 wt % to less than 3.0 wt % wax, based on the weight of the wood strands in the layer.

5. The oriented strand board according to claim 1, wherein the oriented strand board exhibits less than about 3 to 4 flake pops after being exposed to 48 hours of simulated rain from a garden sprinkler.

6. The oriented strand board according to claim 1, wherein the oriented strand board exhibits less than about 1 flake pop after being exposed to 48 hours of simulated rain from a garden sprinkler.

7. An oriented strand board, comprising:
first and second surface layers each comprised of wood strands substantially oriented in a first direction, wherein the wood strands are bonded by curing of a binder material contacting the wood strands wherein the binder material is substantially free of water and comprised of a curable powder aldehyde resin and a curable isocyanate resin;
a core layer located between and bonded to the first and second surface layers, where the core layer comprises wood strands substantially oriented in a second direction that is different from the first direction; and
wherein the oriented strand board exhibits less than about 3 to 4 flake pops after being exposed to 48 hours of simulated rain from a garden sprinkler.

8. The oriented strand board according to claim 7, wherein the oriented strand board exhibits less than about 1 flake pop after being exposed to 48 hours of simulated rain from a garden sprinkler.

9. The oriented strand board according to claim 7, wherein each layer comprises from about 0.5 wt % to less than 3.0 wt % wax, based on the weight of the wood strands in the layer.

10. An oriented strand board, comprising:
first and second surface layers each comprised of wood strands substantially oriented in a first direction, wherein the wood strands are bonded by curing of a binder material applied to the wood strands, wherein the binder material is substantially free of water and the binder material is applied to the wood strands by [separately] contacting the wood strands in a blender with a curable powder resin and a curable liquid resin at the same time, wherein the powder resin and liquid resin are supplied to the blender from separate feed streams; and
a core layer located between and bonded to the first and second surface layers, where the core layer comprises wood strands substantially oriented in a second direction that is different from the first direction.

11. The oriented strand board according to claim 10, wherein the oriented strand board exhibits less than about 3 to 4 flake pops after being exposed to 48 hours of simulated rain from a garden sprinkler.

12. The oriented strand board according to claim 10, wherein the powder resin is an aldehyde resin and the liquid resin is an isocyanate resin.

13. The oriented strand board according to claim 10, wherein the oriented strand board exhibits less than about 1 flake pop after being exposed to 48 hours of simulated rain from a garden sprinkler.

14. The oriented strand board according to claim 10, wherein each layer comprises from about 0.5 wt % to less than 3.0 wt % wax, based on the weight of the wood strands in the layer.

* * * * *